United States Patent
Moteki et al.

(10) Patent No.: US 9,542,745 B2
(45) Date of Patent: Jan. 10, 2017

(54) APPARATUS AND METHOD FOR ESTIMATING ORIENTATION OF CAMERA

(71) Applicant: FUJITSU LIMITED, Kawasaki-shi, Kanagawa (JP)

(72) Inventors: Atsunori Moteki, Kawasaki (JP); Nobuyasu Yamaguchi, Kawasaki (JP); Takahiro Matsuda, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/611,330

(22) Filed: Feb. 2, 2015

(65) Prior Publication Data

US 2015/0243016 A1    Aug. 27, 2015

(30) Foreign Application Priority Data

Feb. 25, 2014    (JP) ................................. 2014-034439

(51) Int. Cl.
    *G06K 9/00*    (2006.01)
    *G06T 7/00*    (2006.01)
    *G06K 9/32*    (2006.01)

(52) U.S. Cl.
    CPC ............. *G06T 7/004* (2013.01); *G06K 9/3216* (2013.01); *G06T 2207/30204* (2013.01); *G06T 2207/30244* (2013.01)

(58) Field of Classification Search
    None
    See application file for complete search history.

(56) References Cited

U.S. PATENT DOCUMENTS

| | | | |
|---|---|---|---|
| 2004/0136567 A1* | 7/2004 | Billinghurst | G06K 9/32 382/103 |
| 2005/0068316 A1* | 3/2005 | Endo | G06T 7/0024 345/419 |

(Continued)

FOREIGN PATENT DOCUMENTS

| | | |
|---|---|---|
| JP | 2003-269913 | 9/2003 |
| JP | 2005-326274 | 11/2005 |
| JP | 2013-141049 | 7/2013 |

OTHER PUBLICATIONS

Kato et al., "An Augmented Reality System and its Calibration based on Marker Tracking", *Transactions of the Virtual Reality Society of Japan*, Dec. 1999, pp. 607-616, vol. 4, No. 4.

(Continued)

*Primary Examiner* — Tahmina Ansari
(74) *Attorney, Agent, or Firm* — Staas & Halsey LLP

(57) ABSTRACT

An orientation estimation apparatus estimates a position and an orientation of an image capturing unit based on positions of a marker on the image and in the real space when the maker is detected; and based on positions of feature points on the captured image and in the real space, and initial values of the position and the orientation of the unit when the maker is not detected. Further, the apparatus calculates a failure index from a first image acquired while the position and the orientation are estimated by the position of marker, where the failure index indicates a possibility that the detection of the marker is failed. When the failure index satisfies a shift-preparation-start reference, the initial values are set from the position and the orientation estimated by the position of the marker on the image having been acquired in a predetermined period before the first image.

8 Claims, 9 Drawing Sheets

(56) References Cited

U.S. PATENT DOCUMENTS

| | | | |
|---|---|---|---|
| 2006/0120606 A1* | 6/2006 | Furuhashi | G06T 7/0042 |
| | | | 382/190 |
| 2015/0016680 A1* | 1/2015 | Mack | G06T 19/006 |
| | | | 382/103 |
| 2015/0243016 A1* | 8/2015 | Moteki | G06T 7/004 |
| | | | 382/103 |

OTHER PUBLICATIONS

Lowe, "Distinctive Image Features from Scale-Invariant Keypoints", *International Journal of Computer Vision*, 2004, pp. 91-110, vol. 60, No. 2.

Ishii et al., "Proposal and Evaluation of Decommissioning Support Method of Nuclear Power Plants Using Augmented Reality", *Transactions of the Virtual Reality Society of Japan*, Jun. 2008, 12 pp., vol. 13, No. 2.

Yamada et al., "Latest Algorithm for 3-D Reconstruction from Two Views", *IPSJ SIG Technical Report*, 2009, pp. 1-8, vol. 2009-CVIM-168-15.

Klein et al. "Parallel Tracking and Mapping for Small AR Workspaces", In proceedings of *6th IEEE and ACM International Symposium on Mixed and Augmented Reality*, 2007, 10 pp.

\* cited by examiner

| NUMBER | X [mm] | Y [mm] | Z [mm] | TYPE FLAG | FEATURE AMOUNT |
|---|---|---|---|---|---|
| 1 | 126 | 59 | 329 | f | (0.264, ...) |
| 2 | 314 | 193 | 289 | f | (0.822, ...) |
| 3 | 212 | 59 | 339 | f | (0.652, ...) |
| --- | --- | --- | --- | --- | --- |
| 65 | 25 | 25 | 0 | m | --- |
| 66 | 25 | -25 | 0 | m | --- |
| 67 | -25 | 25 | 0 | m | --- |
| 68 | -25 | -25 | 0 | m | --- |

| TIME | POSITION AND ORIENTATION OF IMAGE CAPTURING UNIT | COORDINATES OF MARKER |
|---|---|---|
| 0 | (13.4, 20.2, 403.9, 0.24, 0.34, 0.55) | (243, 112) (293, 112) (293, 162) (243, 262) |
| 1 | (13.6, 20.4, 403.7, 0.26, 0.33, 0.52) | (242, 111) (291, 114) (290, 163) (241, 263) |
| 2 | (13.8, 20.6, 403.6, 0.29, 0.31, 0.54) | (240, 110) (290, 115) (288, 164) (243, 264) |
| --- | --- | --- |

APPARATUS AND METHOD FOR ESTIMATING ORIENTATION OF CAMERA

CROSS-REFERENCE TO RELATED APPLICATION

This application is based on and claims the benefit of priority of the prior Japanese Patent Application No. 2014-034439, filed on Feb. 25, 2014, the entire contents of which are incorporated herein by reference.

FIELD

The embodiments discussed herein are related to an orientation estimation apparatus, an orientation estimation method, and a computer-readable medium storing orientation estimation computer program that estimate, based on an image taken by a camera, for example, a position and an orientation of the camera.

BACKGROUND

In recent years, to support user works, a study relating to a so-called Augmented Reality (AR) in which various information is superimposed and displayed on an image taken by a camera has been conducted (for example, see Ishii et al., "Proposal and Evaluation of Decommissioning Support Method of Nuclear Power Plants using Augmented Reality", Transactions of the Virtual Reality Society of Japan, 13(2), pp. 289-300, June 2008).

In a system that implements the AR, in order that information be superimposed on a suitable position on an image taken by a camera, it is requested that a virtual space is accurately aligned to a real space. For that purpose, it is requested that a position and an orientation of the camera in the real space may be accurately grasped. Therefore, proposed is a technique to estimate a position and an orientation of the camera from a position and a shape of a known marker installed in advance on the image (see, for example, Kato et al., "An Augmented Reality System and its Calibration based on Marker Tracking", Transactions of the Virtual Reality Society of Japan, 4(4), pp. 607-616, December 1999).

However, it is difficult to accurately detect a marker on the image in some cases depending on photographed conditions. Moreover, a marker comes off from a photographed range of the camera, and as a result, the marker is not picked up on the image in some cases. In such a case, it is difficult to estimate an orientation of the camera based on the marker. Therefore, proposed is a technique to estimate a position and an orientation of the camera based on multiple feature points extracted from a photographed image (see, for example, Japanese Laid-open Patent Publication No. 2005-326274).

SUMMARY

According to an aspect of the invention, an orientation estimation apparatus includes an image capturing unit that creates an image of a photographed range at a predetermined photographing cycle; a storage unit that stores therein a position of a marker installed in advance in a real space and positions of a plurality of feature points in a surrounding of the marker in the real space; a marker detection unit that detects the marker from the image; a marker-based orientation estimation unit that estimates, based on a position of the marker on the image and the position of the marker in the real space, a position and an orientation of the image capturing unit; a feature point detection unit that detects the plurality of feature points from the image; a feature point-based orientation estimation unit that estimates the position and the orientation of the image capturing unit based on positions of the plurality of feature points on the image, the positions of the plurality of feature points in the real space, and initial values of the position and the orientation of the image capturing unit; a shift determination unit that causes, when the marker is not detected from the image, the feature point detection unit to detect the plurality of feature points with respect to the image and a subsequent image to be acquired after the image, and the feature point-based orientation estimation unit to estimate the position and the orientation of the image capturing unit; a shift preparation start determination unit that calculates, from a first image acquired while the marker-based orientation estimation unit estimates the position and the orientation of the image capturing unit, at least one failure index indicating a possibility that the detection of the marker is failed, and determines whether or not the at least one failure index satisfies a shift preparation start reference; and an initial orientation setting unit that sets, when the at least one failure index satisfies the shift preparation start reference, the initial values of the position and the orientation of the image capturing unit from the position and the orientation of the image capturing unit estimated based on the position of the marker on the image having been acquired in a predetermined period before the first image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
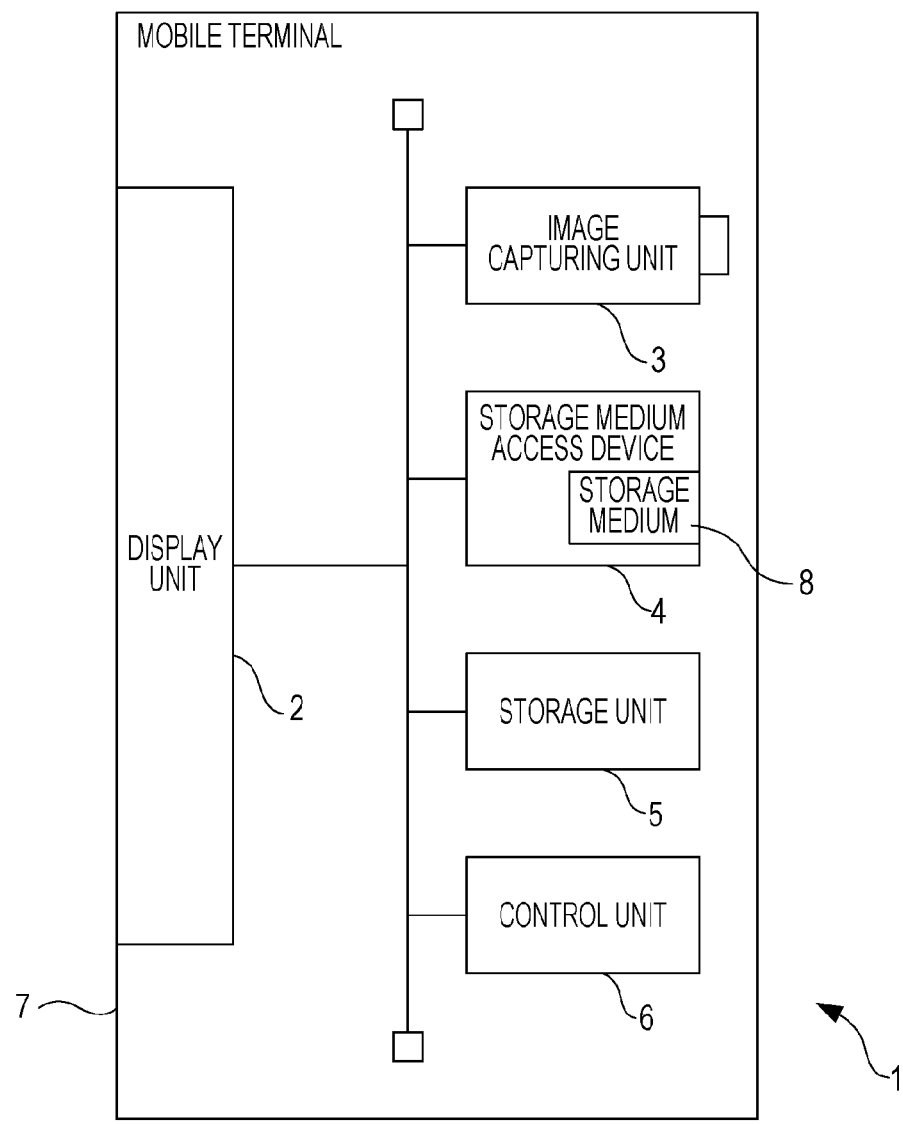
FIG. 1 is a hardware configuration diagram of a mobile terminal that is one embodiment of an orientation estimation apparatus.

To estimate a position and an orientation of a camera based on multiple feature points, more calculations than those when a position and an orientation of a camera is estimated based on a marker is made because calculation to associate a point on a three-dimensional space with a point on a two-dimensional image is repeated. The more the amount of calculation is, the more the power consumption of a hardware that executes the calculation becomes. Meanwhile, when the AR is mounted on a device with the reduced capacity of a power supply, such as a mobile terminal with a camera, the lesser amount of calculation is preferable.

Consequently, it is desired to provide an orientation estimation apparatus that may restrict, even when a marker may not be detected from an image taken by an image capturing unit, lowering of the estimation accuracy of a position and an orientation of the image capturing unit, and may restrict the amount of calculation.

Hereinafter, an orientation estimation apparatus will be described with reference to the drawings. Every time an image capturing unit takes an image of a surrounding thereof at a predetermined photographing cycle and creates an image thereof, the orientation estimation apparatus estimates, based on the image, a position and an orientation of the image capturing unit when taking the image. At that time, when a pre-installed marker of which shape and install position are known is picked up on the image and the marker may be detected from the image, the orientation estimation apparatus estimates a position and an orientation of the image capturing unit based on the position of the maker on the image to restrict the amount of calculation. In contrast, when the marker may not be detected from the image, the orientation estimation apparatus detects, from the image, multiple feature points (hereinafter, referred to as natural feature points) that are present in the surrounding of the marker and are picked up on the image, and estimates a position and an orientation of the image capturing unit based on the feature points.

Moreover, when determining that the marker may not highly likely be detected from the image, the orientation estimation apparatus applies a prediction filter to a position and an orientation of the image capturing unit based on the marker on a previously acquired image to start estimation of a position and an orientation of the image capturing unit. Further, when the orientation estimation apparatus may not detect the marker from the image and switches the orientation estimation to orientation estimation based on natural feature points, the orientation estimation apparatus uses the position and the orientation of the image capturing unit estimated by the prediction filter as initial values to execute estimation of a position and an orientation based on natural feature points. With this, the orientation estimation apparatus restricts lowering of the estimation accuracy when estimating a position and an orientation of the image capturing unit based on natural feature points.

FIG. 1 is a hardware configuration diagram of a mobile terminal that is one embodiment of an orientation estimation apparatus. A mobile terminal 1 includes a display unit 2, an image capturing unit 3, a storage medium access device 4, a storage unit 5, and a control unit 6. The display unit 2, the image capturing unit 3, the storage medium access device 4, the storage unit 5, and the control unit 6 are disposed in a housing 7. Note that, the mobile terminal 1 is, for example, a mobile telephone set, a mobile information terminal, or a tablet type computer. In addition, the mobile terminal 1 may include a communication interface circuit (not illustrated) for connecting the mobile terminal 1 to other devices. It is noted that FIG. 1 is a diagram for explaining components included in the mobile terminal 1, but is not a diagram representing actual arrangements of the respective components of the mobile terminal 1.

The mobile terminal 1 estimates a position and an orientation of the image capturing unit 3, based on a marker or natural feature points that are picked up on an image obtained such that the image capturing unit 3 takes images of the surrounding at every predetermined photographing cycle. Further, the mobile terminal 1 may use estimation results of the position and the orientation to superimpose various information on the image, thereby providing AR to a user.

The display unit 2 includes, for example, a liquid crystal display or an organic electroluminescent display, and is disposed in such a manner that a display screen of the display unit 2 is directed to the user who is opposed to a front surface of the housing 7. Further, the display unit 2 displays various information such as the image created by the image capturing unit 3, to the user. Moreover, the display unit 2 may preferably include a touch panel display. In this case, the display unit 2 displays, for example, various icons or operation buttons in response to a control signal from the control unit 6. Further, the user touches a position of the icon or the operation button that is displayed, the display unit 2 creates an operation signal in accordance with the position, and outputs the operation signal to the control unit 6.

The image capturing unit 3 includes, for example, an image sensor that includes solid image pickup elements disposed in a two-dimensional array form, and an imaging optical system that forms an image of a subject on the image sensor.

The image capturing unit 3 takes the images of a surrounding of the mobile terminal 1 at every predetermined photographing cycle to create an image at this photographing cycle. Further, an image to be created may preferably be a color image represented by an RGB colorimetric system, or may preferably be a gray image. Further, every time the image capturing unit 3 creates an image, the image capturing unit 3 outputs the created image to the control unit 6. Further, the photographing cycle is, for example, 33 msec.

The storage medium access device 4 is, for example, a device that accesses a storage medium 8 such as a semiconductor memory card. The storage medium access device 4 reads in, for example, a computer program that is stored in the storage medium 8 and is to be executed on the control unit 6, and passes the computer program to the control unit 6. Moreover, as is described later, when the control unit 6 executes a computer program that implements a function of an orientation estimation apparatus, the storage medium access device 4 may preferably read in an orientation estimation computer program from the storage medium 8, and pass the orientation estimation computer program to the control unit 6.

The storage unit 5 includes, for example, a read/writable nonvolatile semiconductor memory and a read/writable volatile semiconductor memory. Further, the storage unit 5 stores therein various kinds of application programs that are executed on the control unit 6 and various kinds of data. Moreover, the storage unit 5 stores therein various kinds of data that are used for orientation estimation processing. For example, the storage unit 5 stores therein information indicating a position and an orientation of the image capturing unit 3 that is estimated from images acquired during the latest certain period (for example, a period corresponding to several frames to several tens of frames).

In addition, the storage unit 5 stores therein a three-dimensional map in which three-dimensional coordinates of a marker, three-dimensional coordinates of each of multiple natural feature points, and a feature amount for specifying the natural feature point, in a three-dimensional world coordinate system set in a real space, are stored.

Figure 2:
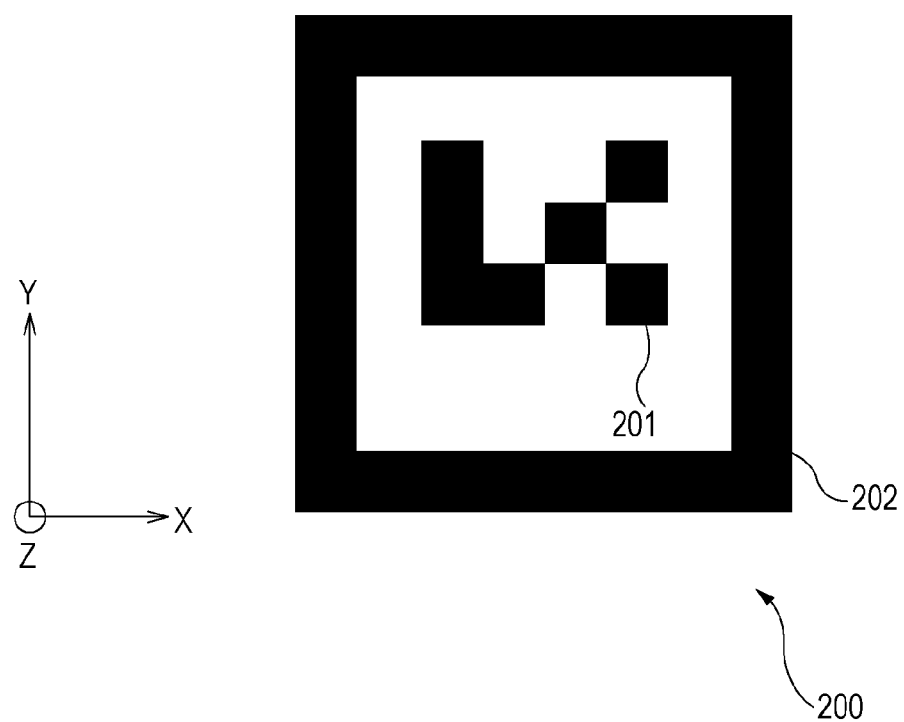
FIG. 2 is a view illustrating an example a marker.

FIG. 2 is a view illustrating an example of a marker. A marker 200 includes an the identification pattern 201 and a rectangular pattern 202 that surrounds the identification pattern 201. The identification pattern 201 may preferably be any pattern as long as it is easily distinguished from a design of the surrounding of a place where the marker 200 is installed, for example. In the present embodiment, in order to estimate a position and an orientation of the image capturing unit 3, positions of the four corners on the outer circumference of the rectangular pattern 202 are detected on the image. Further, the marker is not limited to that illustrated in FIG. 2, but any marker as long as it is easily distinguished from a design of the surrounding of a place where the marker is installed may be preferably used. Moreover, other positions of the marker may preferably be used for the estimation of a position and an orientation of the image capturing unit 3.

Note that, in the present embodiment, for simplification of the world coordinate system set in the real space, an original point is set at the center of a marker, an X-axis and a Y-axis are set on a plane where the marker is included, and a Z-axis is set on a normal line of the plane where the marker is included.

Figure 3:
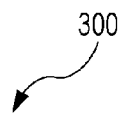
FIG. 3 is a view illustrating an example of a three-dimensional map in which three-dimensional coordinates of the marker, and three-dimensional coordinates and the feature amount of each natural feature point are stored.

FIG. 3 is a view illustrating an example of a three-dimensional map. In each line of a three-dimensional map 300, recorded are three-dimensional coordinates of any one of natural feature points or the four corners on the outer circumference of a marker, a type flag (natural feature point: f and marker: m) indicating whether the marker or the natural feature point, and the feature amount of the natural feature point. In this example, three-dimensional coordinates and the like of the respective natural feature points are recorded in 1st to 64th lines, for example. Moreover, three-dimensional coordinates and the like of the four corners of the marker are recorded in 65th to 68th lines.

Further, the feature amount of a natural feature point may preferably be any feature amount as long as it may be used to specify the natural feature point on an image, and for example, may preferably be a luminance value of a pixel on an image at which the natural feature point is positioned and a luminance value of eight vicinity pixels or 24 vicinity pixels in the surrounding. Alternatively, the feature amount of a natural feature point may preferably be a value of each color of a pixel on an image at which the natural feature point is positioned or eight vicinity pixels or 24 vicinity pixels in the surrounding. Still alternatively, the feature amount of a natural feature point may preferably be a scalar amount or a vector amount that is obtained by calculation to detect the natural feature point from an image. For example, in order to detect natural feature points from an image, when Scale-Invariant Feature Transform (SIFT) is calculated, the feature amount of a natural feature point may preferably be a SIFT value of a pixel on an image at which the natural feature point is positioned. Note that, as for the calculation of an SIFT value and the detection of feature points by SIFT, for example, see David G. Lowe, "Distinctive Image Features from Scale-Invariant Keypoints", *International Journal of Computer Vision*, Vol. 60, No. 2, pp. 91-110, 2004.

Three-dimensional coordinates of the four corners of a marker and each natural feature point are measured in advance in order to create a three-dimensional map before processing of estimating a position and an orientation of the image capturing unit 3 is executed. For example, in two images obtained in such a manner that the image capturing unit 3 takes images of a marker and a surrounding thereof at each of different two points of which position and orientation (optical axis direction) are known in advance, the four corners of the marker and natural feature points are respectively detected. At that time, the control unit 6 may preferably perform feature point detection processing, for example, template matching or corner detection filtering to detect the four corners of the marker and the natural feature points. Alternatively, a user may preferably designate the four corners of the marker and the natural feature points on each of the images.

Next, out of natural feature points detected from each of the images, the natural feature points indicating the same natural feature point are associated to each other. At that time, the control unit 6 may preferably determine, for example, natural feature points on the two images in which the SIFT calculation values are most corresponded or natural feature points on the two images that are most corresponded by pattern matching of surrounding regions of the natural feature points on the images, as to be corresponded to the same natural feature point.

Each pixel on the image indicates an angle relative to the optical axis of the image capturing unit 3. Accordingly, as natural feature points detected from an image acquired at a certain photographed point, a direction from the photographed point to the natural feature point may be obtained. Accordingly, when positions of pixels on two images corresponding to the same natural feature point are respectively known, three-dimensional coordinates of the natural feature point may be obtained in accordance with the principle of triangulation. Similarly, three-dimensional coordinates of the four corners of the marker may be obtained.

Moreover, the control unit 6 may preferably calculate the feature amount of each natural feature point obtained from the three-dimensional coordinates, from any of the images in which the natural feature point is detected, based on a pixel corresponding to the natural feature point and pixels in the surrounding thereof. Note that, three-dimensional coordinates of the four corners of a marker and natural feature points may preferably be obtained by various methods in which from multiple images, a position of an object picked up on the images is obtained, for example, in accordance with a method disclosed in Yamada et al., "Latest Algorithm for 3-D Reconstruction from Two Views", IPSJ SIG Technical Report, vol. 2009-CVIM-168-15, pp. 1-8, 2009.

The control unit 6 includes, one processor or multiple processors and surrounding circuits thereof. Further, the control unit 6 is connected to the respective units of the mobile terminal 1 via signal lines, and controls the entire mobile terminal 1. Moreover, every time the control unit 6 receives an image from the image capturing unit 3, the control unit 6 estimates a position and an orientation of the image capturing unit 3 based on a marker or natural feature points that are picked up on the image. Note that, hereinafter, estimation processing of a position and an orientation of the image capturing unit 3 based on a marker is referred to as marker-based orientation estimation processing. Meanwhile, estimation processing of a position and an orientation of the image capturing unit 3 based on natural feature points is referred to as natural feature point-based orientation estimation processing.

Figure 4:
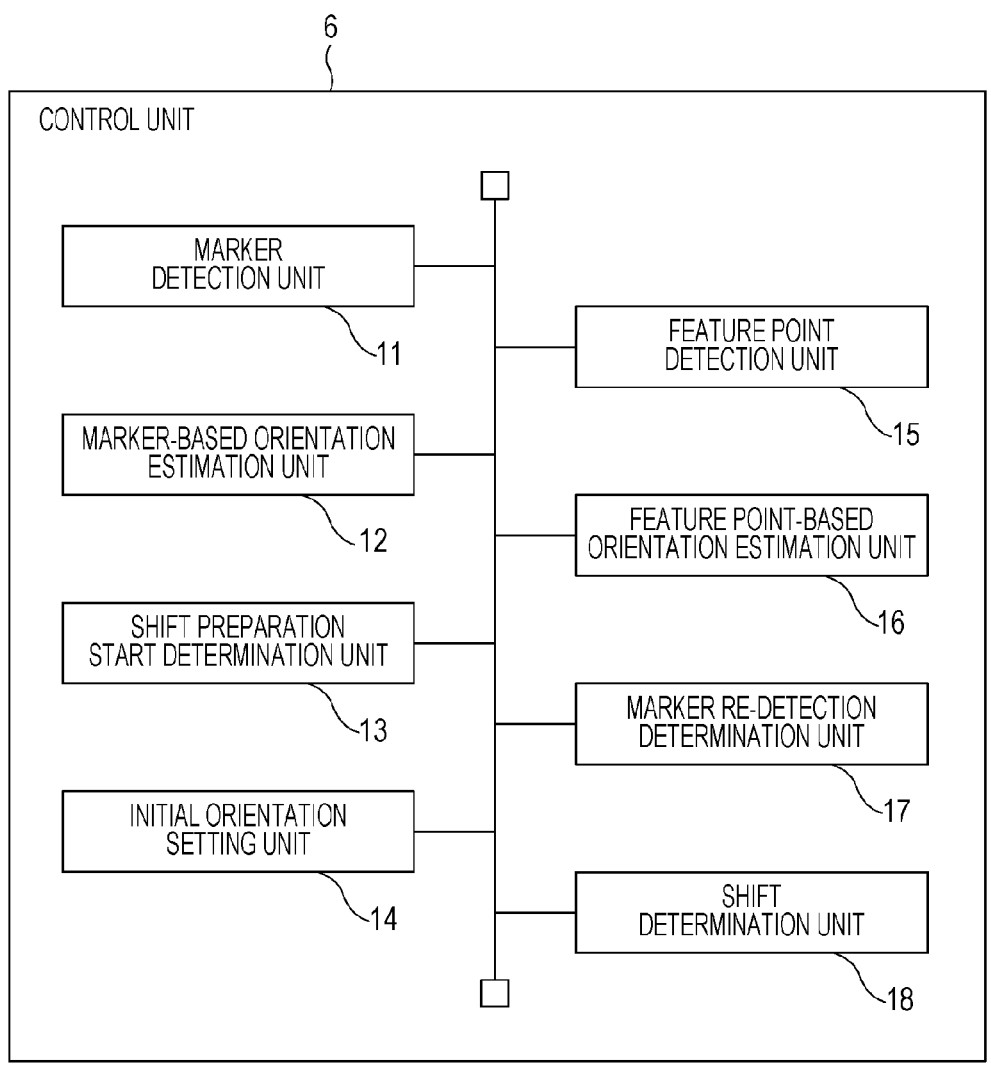
FIG. 4 is a functional block diagram of a control unit.

FIG. 4 is a functional block diagram of the control unit 6. The control unit 6 includes a marker detection unit 11, a marker-based orientation estimation unit 12, a shift preparation start determination unit 13, an initial orientation setting unit 14, a feature point detection unit 15, a feature point-based orientation estimation unit 16, a marker re-detection determination unit 17, and a shift determination unit 18. Each of these units included in the control unit 6 is implemented by, for example, a computer program that is executed on the control unit 6. Further, these respective units included in the control unit 6 may preferably be mounted on the mobile terminal 1 as an integrated circuit that implements functions of these respective units, independent of the processor included in the control unit 6.

While the control unit 6 executes the marker-based orientation estimation processing, or when it is determined that there is a possibility that the marker-based orientation estimation processing may be restarted, every time the marker detection unit 11 obtains an image from the image capturing unit 3, the marker detection unit 11 detects a marker from the image.

For that purpose, the marker detection unit 11 performs template matching on the image using, for example, multiple templates representing patterns seen from the various directions to detect a marker on the image.

At that time, in order to accelerate the marker detection processing, the marker detection unit 11 may preferably binarize each pixel in the image depending on whether a luminance value thereof is a predetermined threshold value or more. For example, the rectangular pattern 202 of the marker 200 and the identification pattern 201 inside the rectangular pattern 202 illustrated in FIG. 2 are blacker than a surrounding thereof. This results in a luminance value of pixels corresponding to those patterns lower than a luminance value of pixels in the surrounding, even on the image. Accordingly, on the binarized image, the pixels corresponding to the patterns included in the marker 200 have a pixel value different from that of other pixels. For example, the marker detection unit 11 makes a luminance value of a pixel on the binarized image corresponding to a pixel having a luminance value equal to or more than a predetermined threshold value relative high, and makes a luminance value of a pixel on the binarized image corresponding to a pixel having a luminance value less than the threshold value relative low. Accordingly, the pixels corresponding to the patterns included in the marker have a relative low luminance value. Hereinafter, a pixel on the binarized image having a relative low luminance value is referred to as a black pixel for convenience.

The marker detection unit 11 executes labeling processing on a set of black pixels to obtain one or more of a black pixel region that is a region in which the black pixels are connected to one another. Further, the marker detection unit 11 performs edge following on each black pixel region to obtain an edge of each black pixel region. In addition, the marker detection unit 11 performs broken line approximation on each edge to set a black pixel region in which the edge may be approximated with four lines as a marker candidate region. The marker detection unit 11 performs template matching between the marker candidate region and a template, and calculates, for example, a normalized cross-correlation value between the marker candidate region and the template in accordance with the following expression.

$$R = \frac{\sum_{j=0}^{N-1}\sum_{i=0}^{M-1}\{(I(i,j) \cdot I_{av})(T(i,j) - T_{av})\}}{\sqrt{\left\{\sum_{j=0}^{N-1}\sum_{i=0}^{M-1}(I(i,j) - I_{av})^2\right\}\left\{\sum_{j=0}^{N-1}\sum_{i=0}^{M-1}(T(i,j) - T_{av})^2\right\}}} \quad (1)$$

Herein, $T(i,j)$ represents a luminance value of a pixel $(i,j)$ of the template, and $I(i,j)$ represents a luminance value of a pixel $(i,j)$ in the marker candidate region. Further, Tav represents a luminance mean value of the template, and Iav represents a luminance mean value of the marker candidate region.

When the maximum value of the normalized cross-correlation value becomes a marker detection threshold value (for example, 0.8) or more, the marker detection unit 11 determines that a marker is picked up in a marker candidate region corresponding to the maximum value of the normalized cross-correlation value. Further, the marker detection unit 11 sets coordinates of the four corners of the marker candidate region as coordinates of the marker on the image.

In contrast, when the maximum value of the normalized cross-correlation value is less than the marker detection threshold value, the marker detection unit 11 determines that a marker is not picked up in the marker candidate region.

Further, when the marker re-detection determination unit 17 limits a search region of a marker, the marker detection unit 11 executes detection processing of the marker within the limited search region. Note that, details of the marker re-detection determination unit 17 and a search region of a marker are described later. Moreover, the marker detection unit 11 may preferably set a region in which a circumscribed rectangle of a region surrounded by the four corners of a marker on an image obtained immediately prior is expanded by a predetermined offset in the vertical direction and in the horizontal direction, as a marker search region with respect to a current image, and perform marker detection processing within the marker search region.

Every time the marker detection unit 11 obtains coordinates of the four corners of a marker on an image, the marker detection unit 11 stores the coordinates in the storage unit 5 so as to indicate an acquisition order of the corresponding image.

Every time a marker is detected form the image obtained by the image capturing unit 3, the marker-based orientation estimation unit 12 estimates a position and an orientation of the image capturing unit 3 based on the marker.

The marker-based orientation estimation unit 12 estimates, in order to estimate a position and an orientation of the image capturing unit 3, for example, a conversion matrix from a world coordinate system in which a marker is used as the reference to a camera coordinate system in which the image capturing unit 3 is used as the reference.

The conversion matrix is represented by the following expression.

$$\begin{bmatrix} Xc \\ Yc \\ Zc \\ 1 \end{bmatrix} = \begin{pmatrix} R & T \\ 0\ 0\ 0 & 1 \end{pmatrix} \begin{bmatrix} X_m \\ Y_m \\ Z_m \\ 1 \end{bmatrix} = \begin{bmatrix} R_{11} & R_{12} & R_{13} & T_1 \\ R_{21} & R_{22} & R_{23} & T_2 \\ R_{31} & R_{32} & R_{33} & T_3 \\ 0 & 0 & 0 & 1 \end{bmatrix} \begin{bmatrix} X_m \\ Y_m \\ Z_m \\ 1 \end{bmatrix} \quad (2)$$

Herein, (Xc, Yc, Zc) represents three-dimensional coordinates in the camera coordinate system that correspond to points of three-dimensional coordinates (Xm, Ym, Zm) in the world coordinate system in which a marker is used as the reference. Moreover, a matrix R represents a rotation movement component and a matrix T represents a parallel movement component. Further, a Z-axis in the camera coordinate system is set in parallel with an optical axis of the image capturing unit 3.

Moreover, a relation between the camera coordinate system and a coordinate system on an image to be created by the image capturing unit 3 is represented in accordance with a perspective transformation model by the following expression.

$$\begin{bmatrix} xc \\ yc \\ h \\ 1 \end{bmatrix} = P \begin{bmatrix} X_c \\ Y_c \\ Z_c \\ 1 \end{bmatrix} = \begin{bmatrix} P_{11} & P_{12} & P_{13} & 0 \\ 0 & P_{22} & P_{23} & 0 \\ 0 & 0 & 1 & 0 \\ 0 & 0 & 0 & 1 \end{bmatrix} \begin{bmatrix} X_c \\ Y_c \\ Z_c \\ 1 \end{bmatrix} \quad (3)$$

Herein, (xc, yc) represent coordinates on the image that correspond to points of $(X_c, Y_c, Z_c)$ on the camera coordinate system.

In order to estimate the matrix R representing the rotation movement component, the marker-based orientation estimation unit 12 obtains a line segment that connects two points among the four corners of the marker to calculate unit direction vectors V1, V2 of two sides of the marker that are opposed to each other.

An expression of the two sides of the marker that are opposed to each other is represented by the following expression.

$$a_1 x + b_1 y + c_1 = 0$$

$$a_2 x + b_2 y + c_2 = 0 \quad (4)$$

Further, the following expression may be obtained substitution of (xc, yc) in Expression 3 into Expression 4.

$$a_1 P_{11} X_c + (a_1 P_{12} + b_1 P_{22}) Y_c + (a_1 P_{13} + b_1 P_{23} + c_1) Z_c = 0$$

$$a_2 P_{11} X_c + (a_2 P_{12} + b_2 P_{22}) Y_c + (a_2 P_{13} + b_2 P_{23} + c_2) Z_c = 0 \quad (5)$$

The Expression 5 is an equation representing planes in which the two sides of the marker that are opposed to each other are present, in the camera coordinate system. The two sides of the marker that are opposed to each other are in parallel with each other. Thus, direction vectors of the two sides are consistent with each other, and become an in-plane direction of the two plane represented by Expression 5. Accordingly, outer products of normal line vectors of the two planes in Expression 5 respectively become unit direction vectors V1, V2 of the two sides.

In addition, the marker-based orientation estimation unit 12 calculates an outer product, that is "vector product", of the unit direction vectors V1 and V2 to calculate a unit direction vector V3 in a direction vertical to the marker plane. The matrix R representing the rotation movement component is represented as [V1$^t$V2$^t$V3$^t$].

Moreover, the marker-based orientation estimation unit 12 couples Expression 2 and Expression 3 in order to estimate the matrix T representing the parallel movement component. Further, the marker-based orientation estimation unit 12 inputs coordinates of each of the four corners of the marker on the image and coordinates thereof in the world coordinate system into the coupled expression. This allows the marker-based orientation estimation unit 12 to acquire eight simultaneous equations for three elements [T1, T2, T3] of the matrix T. Consequently, the marker-based orientation estimation unit 12 solves the simultaneous equations by a least-squares method to calculate respective elements [T1, T2, T3] of the matrix T.

In order to reduce an error by calculation of the rotation movement component, the marker-based orientation estimation unit 12 converts respective components of the matrix R so as to be expressed as three rotation angles in the Z-axis of the world coordinate system in the camera coordinate system, in accordance with Rodrigues formula.

The marker-based orientation estimation unit 12 obtains coordinates in the world coordinate system corresponding to a position of the original point in the camera coordinate system, in the acquired conversion matrix. This allows the marker-based orientation estimation unit 12 to estimate a position of the image capturing unit 3. Moreover, the marker-based orientation estimation unit 12 obtains, in the acquired conversion matrix, a direction of the world coordinate system corresponding to an axis Zc (in other words, optical axis) in the camera coordinate system. This allows the marker-based orientation estimation unit 12 to estimate an orientation of the image capturing unit 3, in other words, the optical axis direction of the image capturing unit 3 in the world coordinate system.

The marker-based orientation estimation unit 12 stores the estimated coordinates in the world coordinate system representing the position of the image capturing unit 3 and the estimated unit direction vector in the world coordinate system representing the orientation of the image capturing unit 3, in the storage unit 5.

Figure 5:
FIG. 5 is a view illustrating an example of a list in which a position and an orientation of an image capturing unit 3 for every image acquisition time.

FIG. 5 illustrates an example of a list indicating a position and an orientation of the image capturing unit 3 for every photographing time stored in the storage unit 5. In each line of a list 500, recorded are six-dimensional vector (x, y, z, rx, ry, rz) indicating a position and an orientation of the image capturing unit 3 in the world coordinate system and coordinates of the four corners of a marker on an image. Further, elements x, y, z of the six-dimensional vector indicating a position and an orientation of the image capturing unit 3 respectively represent coordinates in the horizontal direction and coordinates in the vertical direction of the marker plane, and coordinates in the normal line direction of the marker plane. Moreover, elements rx, ry, rz respectively represent angles made by the optical axis of the image capturing unit 3 in the horizontal direction and in the vertical direction with respect to the normal line direction of the marker plane, and a rotation angle of the image capturing unit 3 around the normal line direction of the marker plane.

While the marker-based orientation estimation processing is performed, every time an image is acquired, the shift preparation start determination unit 13 calculates a failure index indicating a possibility that a marker may not be detected from the image.

Figure 6A:
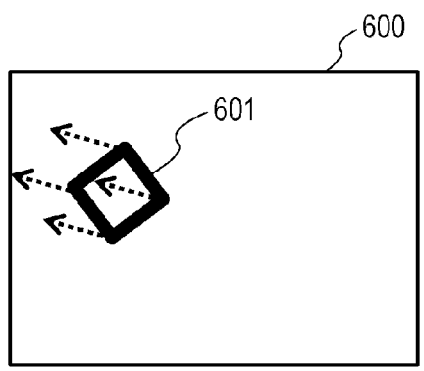
FIG. 6A to FIG. 6D are views each illustrating a case where there is a possibility that a marker may not be detected from an image.
Figure 6B:
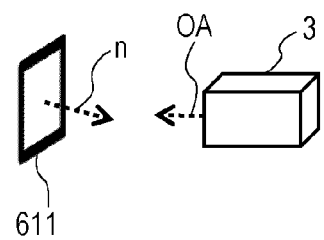

FIG. 6A to FIG. 6D are views each illustrating a case where there is a possibility that a marker may not be detected from an image. An example illustrated in FIG. 6A represents a case where on an image 600, a marker 601 is moved toward an end of the image, and it is assumed that the marker 601 come out from the image 600 in the future. Moreover, in an example illustrated in FIG. 6B, because a normal line n of a marker 611 is largely inclined to an optical axis direction OA of the image capturing unit 3 to cause distortion of the shape of the marker on the image, it is assumed that the marker is difficult to be detected from the image.

Figure 6C:
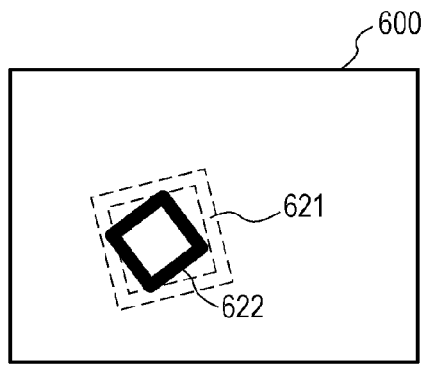
Figure 6D:
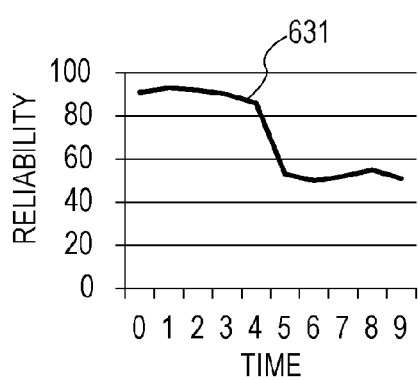

In addition, in an example illustrated in FIG. 6C, the image capturing unit 3 is moved away from a marker to make a marker 622 on a current image smaller than a marker 621 on an image that is acquired immediately prior. From this, it is assumed that the significantly reduced size of the marker on the image 600 makes it difficult to detect the marker in the future. Moreover, an example illustrated in FIG. 6D represents time change in reliability of marker detection, and the horizontal axis represents time and the longitudinal axis represents reliability. In this example, a curve 631 indicating a relation between the time and the reliability is lowered as the time elapses, and in such a case, it is assumed that a marker may not be accurately detected.

Consequently, the shift preparation start determination unit 13 calculates, as a failure index, for example, at least one out of a traveling speed and a current position of coordinates of the four corners of a marker, the inclination of the normal line of the marker with respect to the optical axis of the image capturing unit 3, an area of the marker on the image, and reliability of the marker detection.

When at least one failure index out of the abovementioned multiple failure indices satisfies a shift preparation start reference, the shift preparation start determination unit 13 determines that preparation for shifting orientation estimation processing from marker-based orientation estimation processing to natural feature point-based orientation estimation processing is started. Alternatively, when at least one failure index out of the abovementioned multiple failure indices satisfies the shift preparation start reference over multiple frames, the shift preparation start determination unit 13 may preferably determine that preparation for shifting orientation estimation processing from marker-based orientation estimation processing to natural feature point-based orientation estimation processing is started. Still alternatively, when two or more indices out of the abovementioned multiple failure indices satisfy the shift preparation start reference, the shift preparation start determination unit 13 may preferably determine that preparation for shifting orientation estimation processing from marker-based orientation estimation processing to natural feature point-based orientation estimation processing is started.

For example, the shift preparation start determination unit 13 calculates the traveling speed and the movement direction of each of the four corners of a marker by applying linear interpolation or spline interpolation based on the changing amount of coordinates of the four corners of the marker on the image in the past several frames and the photographing cycle in the past several frames. Further, the shift preparation start determination unit 13 determines that the shift preparation start reference is satisfied when the number of pixels from any image end to the center of gravity of the coordinates of the four corners of the marker (hereinafter, simply referred to as marker gravity center) is a predetermined number of pixels (for example, 50 pixels) or less. Alternatively, the shift preparation start determination unit 13 may preferably determine that the shift preparation start reference is satisfied when a movement direction of the marker gravity center is a direction apart from the center of the image and the traveling speed is a predetermined speed (for example, 5 pixels/frame) or more. Moreover, the shift preparation start determination unit 13 may preferably determine that the shift preparation start reference is satisfied when the number of pixels from the marker gravity center to an image end that is located in the destination of the movement direction of the marker gravity center is a predetermined number of pixels or less and the traveling speed of the marker gravity center is a predetermined speed or more. In this case, the predetermined number of pixels and the predetermined speed are set to values in which a part of the marker is assumed to come off from the image after from several frames to several tens of frames. For example, when the predetermined number of pixels is m pixels (m is an integer of one or more), the predetermined speed may be set to (m/10) pixel/frame.

Moreover, when an angle made between the optical axis of the image capturing unit 3 and the normal line of the marker becomes too large, there is a possibility that the control unit 6 may not detect the marker from the image. Consequently, the shift preparation start determination unit 13 determines that the shift preparation start reference is satisfied when the angle made between the optical axis of the image capturing unit 3 and the normal line of the marker becomes a predetermined angle (for example, 70°) or more.

In addition, when the area of the marker on the image is too small, the control unit 6 may not detect the marker from the image. Consequently, the shift preparation start determination unit 13 determines that the shift preparation start reference is satisfied when the number of pixels included in a quadrangle surrounded by the four corners of the marker on the image (in other words, the area of the marker on the image) is a predetermined area value or less. Further, the predetermined area value is set, for example, as a value obtained such that a minimum size of a marker that allows a pattern of the marker on the image to be identified is multiplied by a safety coefficient (for example, 1.1 to 1.3), to 400, for example.

Further, the shift preparation start determination unit 13 may preferably estimate whether or not the area of the marker decreases in an image in a next frame by applying, for example, linear interpolation based on change in area of the marker on the image in the past several frames. Further, the shift preparation start determination unit 13 may preferably determine that the shift preparation start reference is satisfied when the area of the marker in an image of a current frame is the predetermined area value or less and the area of the marker is estimated to decrease in a next frame.

In addition, when reliability relating to the detection is low at a time of detecting a marker from an image, there is a possibility that the control unit 6 may not detect the marker from the image. Moreover, the reliability relating to the detection may be a maximum value of a normalized cross-correlation value between the image and the template that is calculated by the marker detection unit 11. Consequently, the shift preparation start determination unit 13 determines that the shift preparation start reference is satisfied when the maximum value of the normalized cross-correlation value is a predetermined reliability threshold value or less. Further, the predetermined reliability threshold value is set to a value higher than the marker detection threshold value, for example, to 0.9.

Alternatively, the shift preparation start determination unit 13 may preferably assign weights to the abovementioned multiple indices, and determine whether or not preparation for shifting orientation estimation processing from marker-based orientation estimation processing to natural feature point-based orientation estimation processing is started. For example, when the traveling speed of the image capturing unit 3 is high and a possibility that a marker comes off outside the image is high, when a shift preparation start reference relating to the marker gravity center with respect to one image is satisfied, the shift preparation start determination unit 13 determines that shift preparation to natural feature point-based orientation estimation processing is immediately started. Meanwhile, as for the marker area, the optical axis angle, and the reliability relating to the detection, when the shift preparation start references relating to two or more among those are satisfied, the shift preparation start determination unit 13 determines that shift preparation to natural feature point-based orientation estimation processing is started. Alternatively, as for the marker area, the optical axis angle, and the reliability relating to the detection, when the shift preparation start reference is satisfied with respect to multiple continuous images, the shift preparation start determination unit 13 may preferably determine that shift preparation to the natural feature point-based orientation estimation processing is started.

When determining that the shift preparation to the natural feature point-based orientation estimation processing is started, the shift preparation start determination unit 13 notifies the initial orientation setting unit 14 of the determination.

Moreover, with respect to an image that is acquired after the shift preparation to the natural feature point-based orientation estimation processing is started, when the shift preparation start reference is not satisfied as for any of the abovementioned failure indices, the shift preparation start determination unit 13 may preferably notify the initial orientation setting unit 14 of stop of the shift preparation. Alternatively, with respect to continuous multiple images, when the shift preparation start reference is not satisfied as for any of the abovementioned failure indices, the shift preparation start determination unit 13 may preferably notify the initial orientation setting unit 14 of stop of the shift preparation.

Every time an image is acquired after the initial orientation setting unit 14 is notified from the shift preparation start determination unit 13 that the preparation for shifting the orientation estimation processing to the natural feature point-based orientation estimation processing is started, the initial orientation setting unit 14 determines a position and an orientation of the image capturing unit 3 to be initial values when the natural feature point-based orientation estimation processing is started.

The initial orientation setting unit 14 applies a prediction filter to, for example, the position and the orientation of the image capturing unit 3 for the past several frames from a point determined that the preparation for shifting to the natural feature point-based orientation estimation processing is started, to obtain estimated values of the position and the orientation of the image capturing unit 3 when a next image is acquired. The estimated values may be used as initial values when natural feature point-based orientation estimation processing is started in a case where a marker is not detected from a next image. With this, the initial orientation setting unit 14 may use a position and an orientation of the image capturing unit 3 that are estimated based on a marker on the image when the detection accuracy of the marker is high, as initial values when the natural feature point-based orientation estimation processing is started. This allows the estimation accuracy of the initial values to be improved. In the present embodiment, the initial orientation setting unit 14 uses a particle filter as the prediction filter.

The initial orientation setting unit 14 repeats the following processing for each image in order from the oldest image.

(1) Firstly, the initial orientation setting unit 14 creates a plurality of particles each having a six-dimensional state amount (x, y, z, rx, ry, rz) indicating a position and an orientation of the image capturing unit 3 and a likelihood of the state amount on a random basis. Further, the initial orientation setting unit 14 leaves the state amount of remaining particles unchanged after the second turn. Further, the initial orientation setting unit 14 creates particles newly before the number of particles reaches a predetermined number. Moreover, the likelihood of the respective particles is identical.

(2) Next, the initial orientation setting unit 14 projects the four corners of a marker onto an image plane in accordance with Expression 2 and Expression 3 for each particle corresponding to a temporary position and a temporary orientation of the image capturing unit 3 that are expressed by the state amount included in the particle. Then, the initial orientation setting unit 14 obtains coordinates of a projection point of each of the four corners of the marker on the image plane.

(3) The initial orientation setting unit 14 obtains, for each particle and each of the four corners of the marker, coordinates of the projection point and a distance between the coordinates of the corresponding corners of the maker that are detected from the image, and calculates a likelihood of the particle based on a mean value of the distances. For example, the initial orientation setting unit 14 sets a reciprocal number of a number in which 1 is added to the mean value of the distances as the likelihood. Alternatively, the initial orientation setting unit 14 may preferably calculate a feature amount, for each of the four corners of the marker, by performing feature point detection calculation such as SIFT to each projection point on the image and each point detected from the image, and set a reciprocal number of the error sum of squares between the feature amounts as a likelihood.

(4) The initial orientation setting unit 14 erases a particle of which likelihood is a predetermined threshold value (for example, 0.1) or less.

(5) The initial orientation setting unit 14 weights and averages the state amount of remaining particles with the likelihood of the particles to obtain estimated values of the position and the orientation of the image capturing unit 3.

The initial orientation setting unit 14 acquires the estimated values of the position and the orientation of the image capturing unit 3 by repeating the abovementioned processing before a current image is acquired. The estimated values are stored as initial values of the position and the orientation of the image capturing unit 3 when a next image is acquired. Further, the initial orientation setting unit 14 may preferably store the state amount of each particle remaining in the current image in the storage unit 5. Further, when the marker also is detected from a next image, the initial orientation setting unit 14 may preferably use the stored state amount of each particle to execute the abovementioned processing (1) to processing (5) only once, and update the initial values of the position and the orientation of the image capturing unit 3.

Further, the initial orientation setting unit 14 may preferably use, for setting initial values of the position and the orientation of the image capturing unit 3, other a nonlinear prediction filter such as a Kalman filter or a linear prediction filter, instead of the particle filter.

Moreover, when the initial orientation setting unit 14 is notified from the shift preparation start determination unit 13 that the preparation for shifting the orientation estimation processing to the natural feature point-based orientation estimation processing is stopped, the initial orientation setting unit 14 terminates the setting of initial values.

Figure 7:
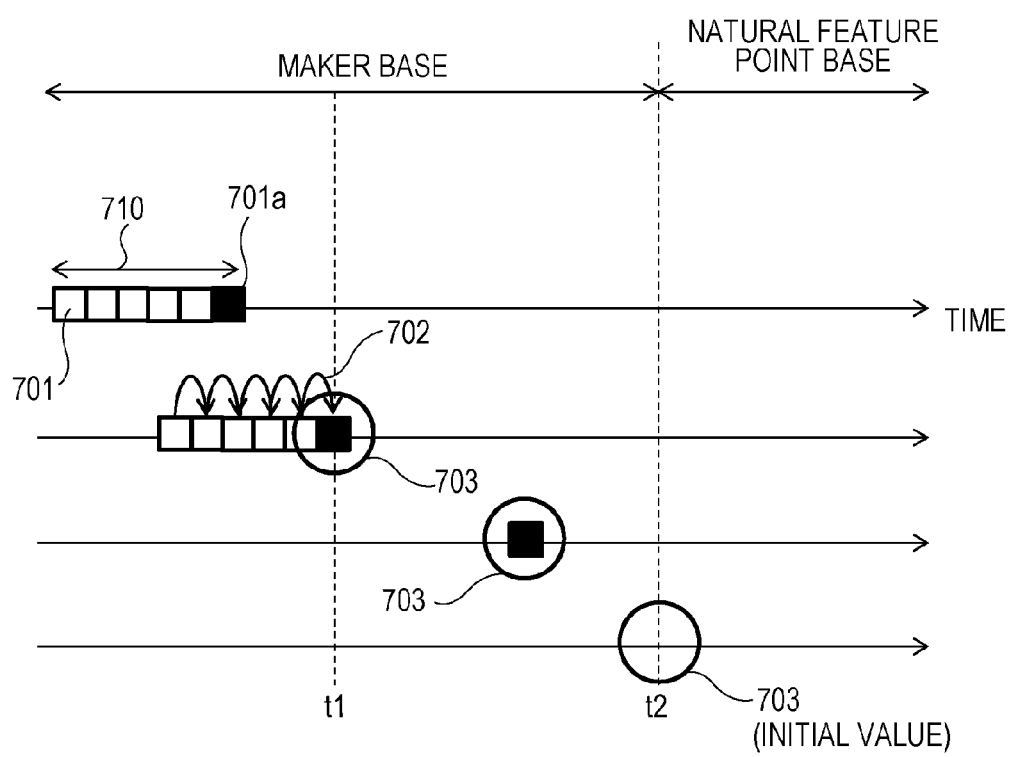
FIG. 7 is a conceptual diagram of initial value prediction in natural feature point-based orientation estimation processing.

FIG. 7 is a conceptual diagram of initial value prediction in the natural feature point-based orientation estimation processing. In FIG. 7, the horizontal axis represents time. In this example, it is assumed that the initial value prediction by the natural feature point-based orientation estimation processing is not performed before time t1, the initial value prediction by the natural feature point-based orientation estimation processing is performed during a period from the time t1 to time t2, and the natural feature point-based orientation estimation processing is performed after the time t2.

Moreover, in FIG. 7, quadrangles 701 each indicate a position and an orientation of the image capturing unit 3 that are estimated based on the marker and stored in the storage unit 5. In particular, a black quadrangle 701a indicates a position and an orientation of the image capturing unit 3 that are estimated based on the marker detected from a current image. Moreover, arrows 702 indicate that estimation of the position and the orientation of the image capturing unit 3 by using the prediction filter is executed. Further, a circle 703 indicates a position and an orientation of the image capturing unit 3 that are estimated using the prediction filter.

Before the time t1, as illustrated in the upper most line, the initial value prediction by the prediction filter is not performed, and the positions and the orientations of the image capturing unit 3 that are estimated based on the marker during a period from the current time to a latest certain period 710 are stored. Further, as illustrated in the second line, when the initial value prediction is started at the time t1, the estimation of the position and the orientation of the image capturing unit 3 using the prediction filter is executed, and an estimated value 703 is stored in the storage unit 5.

Thereafter, before it reaches the time t2, as illustrated in the third line, every time an image is acquired, processing by the prediction filter is performed once to update the estimated value 703. Moreover, the position and the orientation of the image capturing unit 3 that are estimated based on the marker detected from the image are also stored. Further, as illustrated in the lower most line, when the marker is not detected from a current image at the time t2, the estimated value 703 that is calculated when the immediately prior image is acquired is used as initial values of the natural feature point-based orientation estimation processing.

The feature point detection unit 15 detects, every time an image is acquired from the image capturing unit 3, natural feature points from the image, while the control unit 6 executes the natural feature point-based orientation estimation processing. Accordingly, the feature point detection unit 15 performs, for example, corner detection filtering processing or SIFT calculation processing on each pixel in the image to calculate the feature amount indicating a natural feature point for each pixel. Further, the feature point detection unit 15 detects, as the natural feature point, a pixel in which a difference with the feature amount of any of natural feature points recorded in the three-dimensional map is less than a predetermined value.

The feature point-based orientation estimation unit 16 estimates a position and an orientation of the image capturing unit 3 based on natural feature points. Accordingly, the feature point-based orientation estimation unit 16 estimates the rotation movement component and the parallel movement component in Expression 2 using a position and an orientation of the image capturing unit 3 that are estimated based on the immediately prior image as initial values, based on feature points detected from the image. Further, immediately after the estimation processing is shifted from the marker-based orientation estimation processing to the natural feature point-based orientation estimation processing, the feature point-based orientation estimation unit 16 estimates the rotation movement component and the parallel movement component using, as the initial values, the position and the orientation of the image capturing unit 3 that are estimated by applying the prediction filter.

Figure 8:
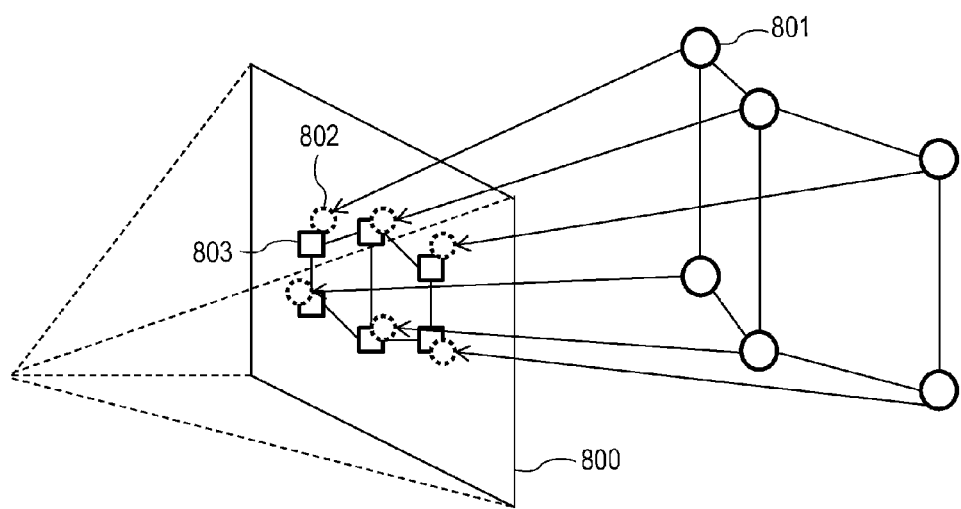
FIG. 8 is a conceptual diagram of the natural feature point-based orientation estimation processing.

FIG. 8 is a conceptual diagram of natural feature point-based orientation estimation processing. The feature point-based orientation estimation unit 16 projects, in accordance with Expression 2 and Expression 3, respective natural feature points 801 onto an image plane 800, and obtains coordinates of each of projection points 802 on the image plane 800 corresponding to coordinates of each of the natural feature points in the world coordinate system. Then, the feature point-based orientation estimation unit 16 calculates, for each natural feature point, the sum of squares of a distance between the projection point 802 and a corresponding natural feature point 803 detected from the image, as an evaluation value.

The feature point-based orientation estimation unit 16 obtains the evaluation value while correcting the respective elements of the rotation movement component and the parallel movement component in accordance with, for example, a steepest-descent method. Then, the feature point-based orientation estimation unit 16 obtains estimated values of the position and the orientation of the image capturing unit 3 in accordance with the rotation movement component and the parallel movement component when the evaluation value becomes minimum.

Further, the feature point-based orientation estimation unit 16 may preferably estimate a position and an orientation of the image capturing unit 3 in accordance with other methods in which a position and an orientation of a camera are estimated based on multiple feature points. For example, the feature point-based orientation estimation unit 16 may preferably estimate a position and an orientation of the image capturing unit 3 in accordance with a method disclosed in G. Klein et al., "Parallel Tracking and Mapping for Small AR Workspaces", in Proceedings of $6^{th}$ IEEE and ACM International Symposium on Mixed and Augmented Reality, Nara, 2007.

In this manner, in the present embodiment, the feature point-based orientation estimation unit 16 determines initial values, when the estimation processing is shifted from the marker-based orientation estimation processing to the natural feature point-based orientation estimation processing, by using the position and the orientation of the image capturing unit 3 that are estimated based on a marker when the marker detection accuracy is high. Accordingly, the initial values are highly likely to be close to the actual position and the actual orientation of the image capturing unit 3, so that the feature point-based orientation estimation unit 16 is highly likely to be able to obtain the minimum value of the evaluation value without falling in a local minimum of the evaluation value that is acquired when the initial values are different from the original position and the original orientation of the image capturing unit 3. Accordingly, the feature point-based orientation estimation unit 16 may improve the estimation accuracy of the position and the orientation of the image capturing unit 3 when the estimation processing is shifted from the marker-based orientation estimation processing to the natural feature point-based orientation estimation processing.

The feature point-based orientation estimation unit 16 stores coordinates in the world coordinate system representing the position of the image capturing unit 3 and the unit direction vector in the world coordinate system representing the orientation of the image capturing unit 3 that are estimated, in the storage unit 5.

The marker re-detection determination unit 17 calculates, while the natural feature point-based orientation estimation processing is executed, every time an image is acquired, a success index representing a possibility that a marker is detected from the image. The marker re-detection determination unit 17 calculates, as a success index, for example, at least one out of the marker gravity center, the inclination of the normal line of the marker with respect to the optical axis of the image capturing unit 3, and the area of the marker on the image.

Further, the marker is not detected at the present. Accordingly, the marker re-detection determination unit 17 projects coordinates of the four corners of the marker recorded in the three-dimensional map onto the image plane, based on the position and the orientation of the image capturing unit 3 estimated by the feature point-based orientation estimation unit 16, in accordance with Expression 2 and Expression 3. Then, the marker re-detection determination unit 17 calculates coordinates of the marker gravity center and the area of the marker from coordinates of the four corners of the marker on the image plane. Similarly, the marker re-detection determination unit 17 calculates the inclination of the normal line of the marker with respect to the optical axis of the image capturing unit 3 based on the orientation of the image capturing unit 3 estimated by the feature point-based orientation estimation unit 16.

When at least one out of the abovementioned multiple success indices satisfies a re-shift preparation start reference, the marker re-detection determination unit 17 determines that preparation for shifting orientation estimation processing from marker-based orientation estimation processing to natural feature point-based orientation estimation processing is started. Alternatively, over multiple frames, when at least one out of the abovementioned multiple success indices satisfies the re-shift preparation start reference, the shift preparation start determination unit 13 may preferably determine that preparation for shifting orientation estimation processing from marker-based orientation estimation processing to natural feature point-based orientation estimation processing is started. Still alternatively, two or more out of the abovementioned multiple success indices satisfy the re-shift preparation start reference, the shift preparation start determination unit 13 may preferably determine that preparation for shifting orientation estimation processing from marker-based orientation estimation processing to natural feature point-based orientation estimation processing is started.

The marker re-detection determination unit 17 determines that the re-shift preparation start reference is satisfied when the number of pixels from the marker gravity center to the closest image end is a predetermined number of pixels (for example, 50 pixels) or more. Alternatively, the marker re-detection determination unit 17 may preferably determine that the re-shift preparation start reference is satisfied when the inclination of the normal line of the marker with respect to the optical axis of the image capturing unit 3 is a predetermined angle (for example, 80°) or less. Still alternatively, the marker re-detection determination unit 17 may preferably determine that the re-shift preparation start reference is satisfied when the area of the marker is a predetermined area threshold value (for example, 100 pixels) or more.

Alternatively, the marker re-detection determination unit 17 may preferably assign weights to the abovementioned multiple success indices, and determine whether or not preparation for shifting the orientation estimation processing to the marker-based orientation estimation processing is started. For example, when the traveling speed of the image capturing unit 3 is high and the entire marker is highly likely to be picked up in an image, the marker re-detection determination unit 17 causes the marker detection unit 11 to immediately execute marker detection when the re-shift preparation start reference as for the marker gravity center with respect to one image is satisfied. Meanwhile, as for the marker area and the optical axis angle, when re-shift preparation start references as for the both, the marker re-detection determination unit 17 causes the marker detection unit 11 to immediately execute marker detection. Alternatively, as for the marker area and the optical axis angle, when the re-shift preparation start reference is satisfied with respect to continuous multiple images, the marker re-detection determination unit 17 may preferably cause the marker detection unit 11 to execute marker detection.

When determining that preparation for shifting orientation estimation processing from marker-based orientation estimation processing to natural feature point-based orientation estimation processing is started with respect to a current image, the marker re-detection determination unit 17 causes the marker detection unit 11 to detect a marker from the current image. At that time, for improving the detection accuracy of the marker and restricting the amount of calculation, the marker re-detection determination unit 17 may preferably limit the search range of the marker. For example, the marker re-detection determination unit 17 sets a region that includes the marker projected on to an image plane and is smaller than the image as the marker search region. Specifically, the marker re-detection determination unit 17 obtains a circumscribed rectangle of a region surrounded by lines connecting the four corners of the marker on an image plane acquired such that coordinates of the four corners in the world coordinate system are projected onto the image plane. Further, when a left upper end pixel of the circumscribed rectangle is (u, v) and a right lower end pixel of the circumscribed rectangle is (u+w, v+h), the marker re-detection determination unit 17 sets a left upper end pixel in the search range of the marker to (u−m, v−m) and a right lower end pixel in the search range of the marker to (u+w+m, v+h+m). Note that m is an offset value, and is set to 10 pixels, for example. Further, when the left upper end pixel (u−m, v−m) in the search range of the marker is outside the image, the marker re-detection determination unit 17 may preferably set the left end or the upper end in the search range as the left end or the upper end of the image. Similarly, when the right lower end pixel (u+w+m, v+h+m) in the search range of the marker is outside the image, the marker re-detection determination unit 17 may preferably set the right end or the lower end in the search range as the right end or the lower end of the image. The marker re-detection determination unit 17 notifies the marker detection unit 11 of the search range of the marker. Further, the marker re-detection determination unit 17 causes the marker detection unit 11 to execute marker detection processing within the search range.

While the marker-based orientation estimation processing is executed, when the marker is not detected from an image, the shift determination unit 18 determines that the orientation estimation processing is shifted to the natural feature point-based orientation estimation processing. Further, the shift determination unit 18 stops the marker detection unit 11 and the marker-based orientation estimation unit 12, and starts up the feature point detection unit 15 and the feature point-based orientation estimation unit 16. Further, when the marker detection unit 11 may not detect all the four corners of the marker, the shift determination unit 18 determines that the marker is not detected.

Meanwhile, while the natural feature point-based orientation estimation processing is executed, when the marker may be detected from an image, the shift determination unit 18 determines that the orientation estimation processing is shifted to the marker-based orientation estimation processing. Further, the shift determination unit 18 stops the feature point detection unit 15 and the feature point-based orientation estimation unit 16, and starts up the marker detection unit 11 and the marker-based orientation estimation unit 12. Further, when the marker is detected from an image over continuous several frames, the shift determination unit 18 may preferably determine that the orientation estimation processing is shifted to the marker-based orientation estimation processing.

Figure 9:
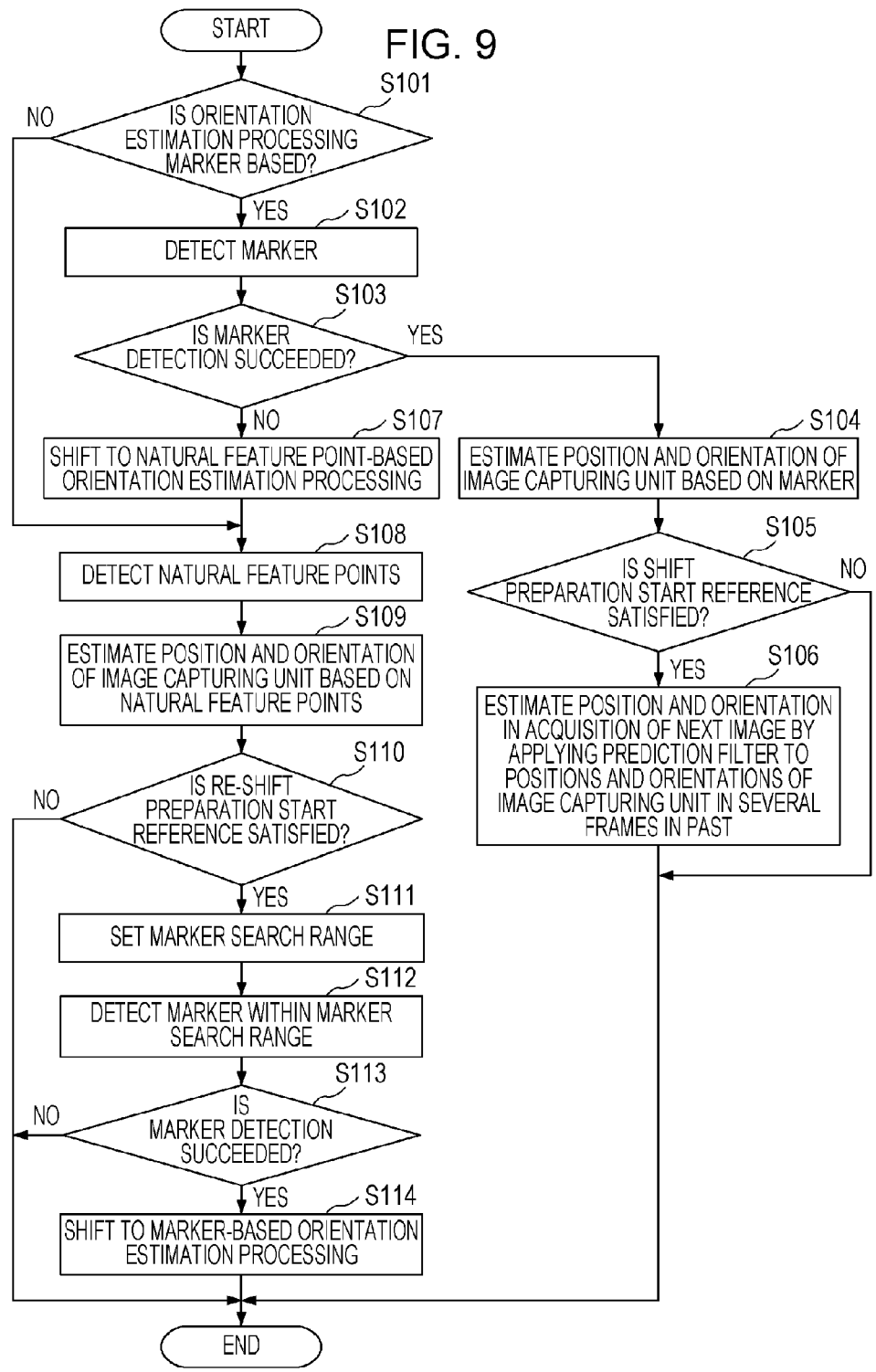
FIG. 9 is an operation flowchart of the orientation estimation processing.

FIG. 9 is an operation flowchart of orientation estimation processing. Every time the control unit 6 acquires an image from the image capturing unit 3, the control unit 6 executes the orientation estimation processing in accordance with the following operation flowchart.

The control unit 6 determines whether or not orientation estimation processing that is currently employed is marker-based orientation estimation processing (step S101). When the orientation estimation processing that is currently employed is marker-based orientation estimation processing (step S101—Yes), the marker detection unit 11 detects a marker from an image (step S102). The shift determination unit 18 determines whether or not the marker is detected from an image (step S103). When the marker is detected from an image (step S103—Yes), the marker-based orientation estimation unit 12 estimates a position and an orientation of the image capturing unit 3 based on a position of the marker on the image (step S104).

Moreover, the shift preparation start determination unit 13 calculates at least one failure index, and determines whether or not the failure index satisfies a shift preparation start reference (step S105). When the shift preparation start reference is satisfied (step S105—Yes), the initial orientation setting unit 14 estimates a position and an orientation of the image capturing unit 3 when a next image is acquired based on the estimated values of the position and the orientation of the image capturing unit 3 in the past several frames. Further, the initial orientation setting unit 14 sets the position and the orientation that are estimated as initial values of the position and the orientation of the image capturing unit 3 when natural feature point-based orientation estimation processing is started (step S106). Further, the initial orientation setting unit 14 stores the initial values in the storage unit 5.

After step S106 or when the shift preparation start reference is not satisfied at step S105 (step S105—No), the control unit 6 ends the orientation estimation processing.

In contrast, at step S103, when the marker is not detected from an image (step S103—No), the shift determination unit 18 determines that the orientation estimation processing is shifted to the natural feature point-based orientation estimation processing, and starts up the feature point detection unit 15 and the feature point-based orientation estimation unit 16 (step S107).

After step S107 or when the orientation estimation processing that is currently employed is natural feature point-based orientation estimation processing at step S101 (step S101—No), the feature point detection unit 15 detects natural feature points from an image (step S108). Further, the feature point-based orientation estimation unit 16 sets estimated values of the position and the orientation of the image capturing unit 3 when an immediately preceding image is acquired as initial values, and estimates a position and an orientation of the image capturing unit 3 based on the detected natural feature points (step S109).

The marker re-detection determination unit 17 calculates at least one success index, and determines whether or not the success index satisfies a re-shift preparation start reference (step S110). When the re-shift preparation start reference is not satisfied (step S110—No), the control unit 6 ends the orientation estimation processing.

In contrast, when the re-shift preparation start reference is satisfied (step S110—Yes), the marker re-detection determination unit 17 sets a marker search range (step S111). Then, the marker detection unit 11 detects the marker within the marker search range (step S112). The shift determination unit 18 determines whether or not the marker is detected from the image (step S113). When the marker is detected from an image (step S113—Yes), the shift determination unit 18 determines that the orientation estimation processing is shifted to the marker-based orientation estimation processing, starts up the marker detection unit 11 and the marker-based orientation estimation unit 12 (step S114).

After step S114 or when the marker is not detected from the image at step S113 (step S113—No), the control unit 6 ends the orientation estimation processing.

As describe above, while a marker may be detected from an image, the orientation estimation apparatus estimates a position and an orientation of the image capturing unit by the marker-based orientation estimation processing to restrict the amount of calculation. Meanwhile, when the marker may not be detected from an image, the orientation estimation apparatus estimates a position and an orientation of the image capturing unit by the natural feature point-based orientation estimation processing. This allows the orientation estimation apparatus to estimate a position and an orientation of the image capturing unit even when the marker may not be detected. In addition, when a possibility that marker detection is failed becomes high, the orientation estimation apparatus uses a position and an orientation of the image capturing unit that are acquired by the marker-based orientation estimation processing when the detection accuracy of the marker is high to estimate a position and an orientation of the image capturing unit when the marker detection is failed. Further, the orientation estimation apparatus uses the estimated values as initial values as the position and the orientation of the image capturing unit when the natural feature point-based orientation estimation processing is started. Accordingly, the orientation estimation apparatus may restrict lowering of the estimation accuracy of the position and the orientation of the image capturing unit when the orientation estimation processing is shifted from the marker-based orientation estimation processing to the natural feature point-based orientation estimation processing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An orientation estimation apparatus, comprising:
at least one processor; and
at least one memory which stores a plurality of instructions, which when executed by the at least one processor, cause the at least one processor to execute:
creating, by an image capturing unit, an image of a photographed range at a predetermined photographing cycle;
storing therein a position of a marker installed in advance in a real space and positions of a plurality of feature points in a surrounding of the marker in the real space;
detecting the marker from the image;

estimating, based on a position of the marker on the image and the position of the marker in the real space, a position and an orientation of the image capturing unit;

detecting the plurality of feature points from the image;

estimating the position and the orientation of the image capturing unit based on positions of the plurality of feature points on the image, the positions of the plurality of feature points in the real space, and initial values of the position and the orientation of the image capturing unit;

detecting, when the marker is not detected from the image, the plurality of feature points with respect to the image and a subsequent image to be acquired after the image, and estimating the position and the orientation of the image capturing unit;

calculating, from a first image acquired while the position and the orientation of the image capturing unit are estimated based on the position of the marker on the image and the position of the marker in the real space, at least one failure index indicating a possibility that the detection of the marker is failed, and determining whether or not the at least one failure index satisfies a shift preparation start reference; and setting, when the at least one failure index satisfies the shift preparation start reference, the initial values of the position and the orientation of the image capturing unit from the position and the orientation of the image capturing unit estimated based on the position of the marker on the image having been acquired in a predetermined period before the first image, wherein the marker is determined to not be detected from the image based on the calculated at least one failure index.

2. The orientation estimation apparatus according to claim 1, wherein the calculating calculates, as the failure index, at least one out of a position of the marker on the first image or a traveling speed of the marker, an area of the marker on the image, an angle made between a normal line direction of the marker and an optical axis direction of the image capturing unit, and reliability of the detection of the marker.

3. The orientation estimation apparatus according to claim 1, wherein the setting sets, when the at least one failure index satisfies the shift preparation start reference, a position and an orientation of the image capturing unit that are estimated by applying a prediction filter to the position and the orientation of the image capturing unit that are estimated based on the position of the marker on the image acquired in the predetermined period as the initial values.

4. The orientation estimation apparatus according to claim 1, wherein the at least one processor further executes:

calculating, from a second image acquired while the position and the orientation of the image capturing unit are estimated based on the positions of the plurality of feature points on the image, the positions of the plurality of feature points in the real space, and the initial values of the position and the orientation of the image capturing unit, at least one success index indicating a possibility that the detection of the marker is succeeded, determines whether or not the at least one success index satisfies a re-shift preparation start reference, and detecting the marker from the second image; and detecting, when the marker is detected from the second image, the marker with respect to a subsequent image to be acquired after the second image, and estimating the position and the orientation of the image capturing unit.

5. The orientation estimation apparatus according to claim 4, wherein the at least one processor further executes:

setting a search range that includes the marker on the second image obtained by projecting the position of the marker in the real space onto the second image based on the position and the orientation of the image capturing unit that are estimated and is smaller than the second image, and detecting the marker within the search range.

6. The orientation estimation apparatus according to claim 4, wherein the at least one processor further executes:

calculating, as the success index, at least one out of a position of the marker on the second image obtained by projecting the position of the marker in the real space onto the second image based on the position and the orientation of the image capturing unit that are estimated, an area of the marker on the second image, and the angle made between the normal line direction of the marker and the optical axis direction of the image capturing unit.

7. An orientation estimation method, comprising:

detecting a marker from an image acquired from an image capturing unit that creates the image of a photographed range at a predetermined photographing cycle;

estimating, based on a position of the marker on the image and a position of the marker in a real space, a position and an orientation of the image capturing unit;

detecting, when the marker is not detected from the image, a plurality of feature points from the image and a subsequent image to be acquired after the image;

estimating the position and the orientation of the image capturing unit based on positions of the plurality of feature points on the image, positions of the plurality of feature points in the real space, and initial values of the position and the orientation of the image capturing unit;

calculating, from a first image acquired while the position and the orientation of the image capturing unit are estimated based on the position of the marker on the image and the position of the marker in the real space, at least one failure index indicating a possibility that the detection of the marker is failed, and determining whether or not the at least one failure index satisfies a shift preparation start reference; and setting, when the at least one failure index satisfies the shift preparation start reference, the initial values of the position and the orientation of the image capturing unit from the position and the orientation of the image capturing unit estimated based on the position of the marker on the image having been acquired in a predetermined period before the first image, wherein the marker is determined to not be detected from the image based on the calculated at least one failure index.

8. A non-transitory computer-readable recording medium storing an orientation estimation computer program for causing a computer to execute a process, the process comprising:

detecting a marker from an image acquired from an image capturing unit that creates the image of a photographed range at a predetermined photographing cycle;

estimating, based on a position of the marker on the image and a position of the marker in a real space, a position and an orientation of the image capturing unit;

detecting, when the marker is not detected from the image, a plurality of feature points from the image and a subsequent image to be acquired after the image;

estimating the position and the orientation of the image capturing unit based on positions of the plurality of feature points on the image, positions of the plurality of feature points in the real space, and initial values of the position and the orientation of the image capturing unit;

calculating, from a first image acquired while the position and the orientation of the image capturing unit are estimated based on the position of the marker on the image and the position of the marker in the real space, at least one failure index indicating a possibility that the detection of the marker is failed, and determine whether or not the at least one failure index satisfies a shift preparation start reference; and setting, when the at least one failure index satisfies the shift preparation start reference, the initial values of the position and the orientation of the image capturing unit from the position and the orientation of the image capturing unit estimated based on the position of the marker on the image having been acquired in a predetermined period before the first image, wherein the marker is determined to not be detected from the image based on the calculated at least one failure index.

* * * * *